Feb. 12, 1952          G. ASHTON          2,585,293
APPARATUS FOR CONTINUOUS COOKING
Filed April 25, 1949          2 SHEETS—SHEET 1
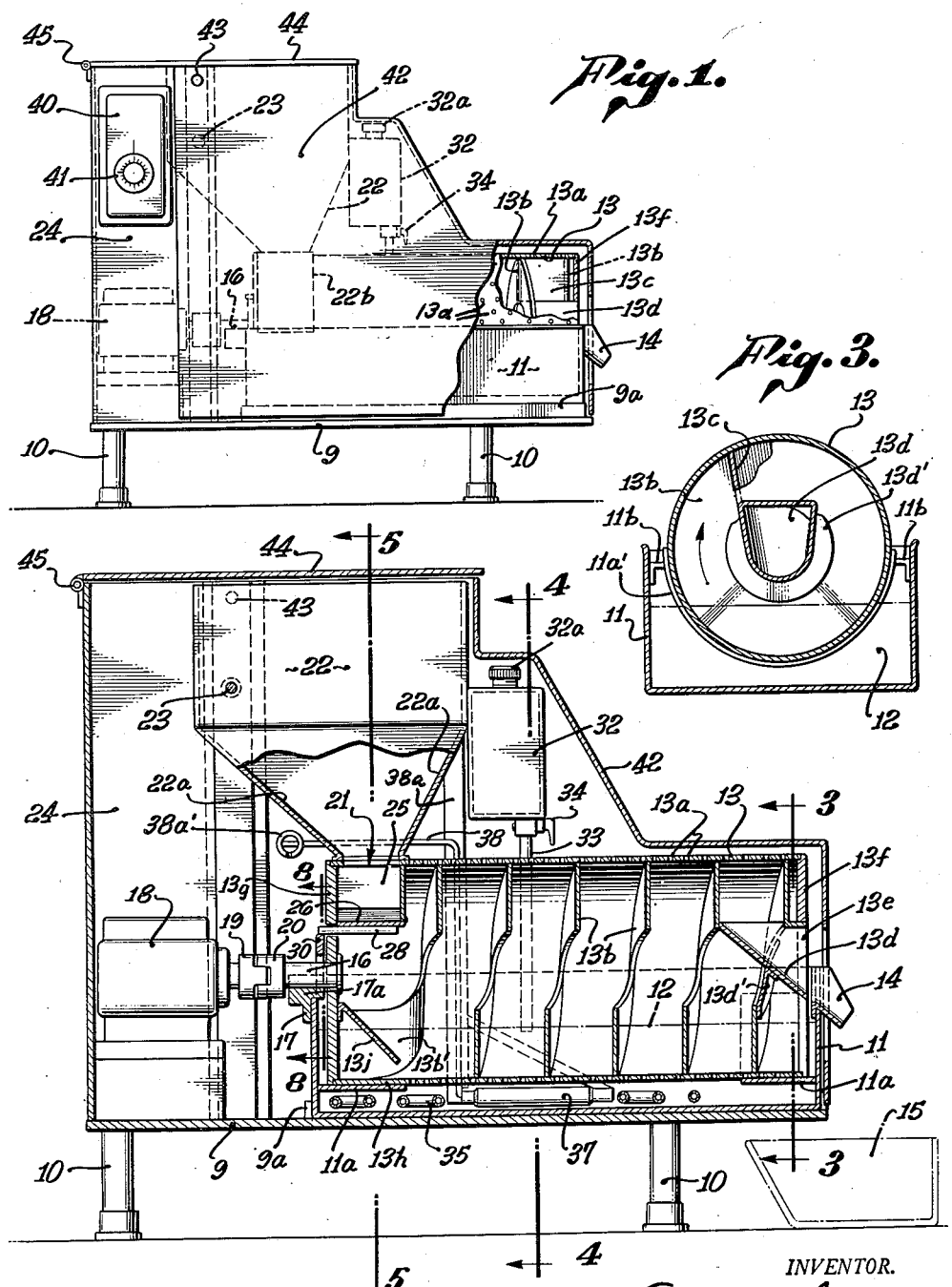
INVENTOR.
GEORGE ASHTON,
BY
ATTORNEYS.

Feb. 12, 1952      G. ASHTON      2,585,293
APPARATUS FOR CONTINUOUS COOKING
Filed April 25, 1949      2 SHEETS—SHEET 2
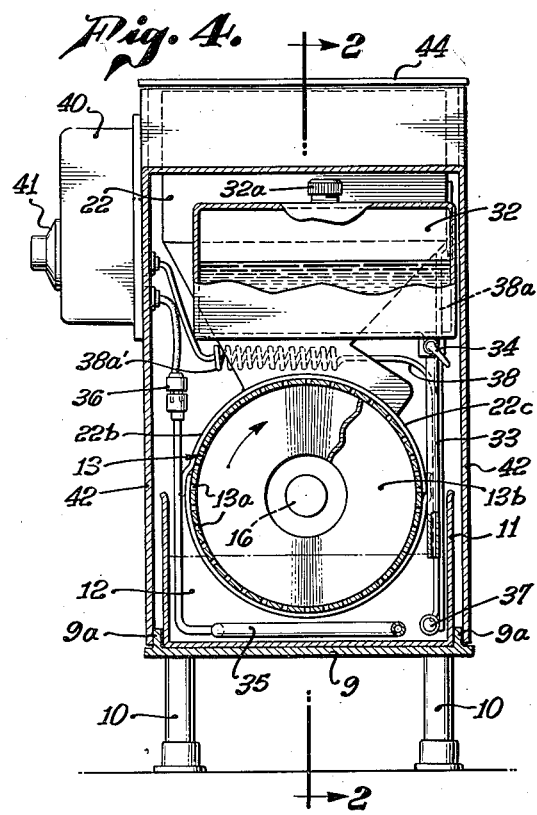
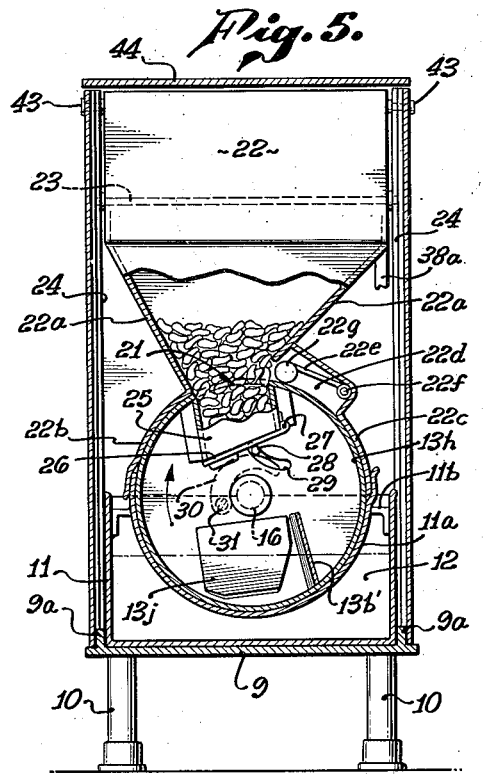
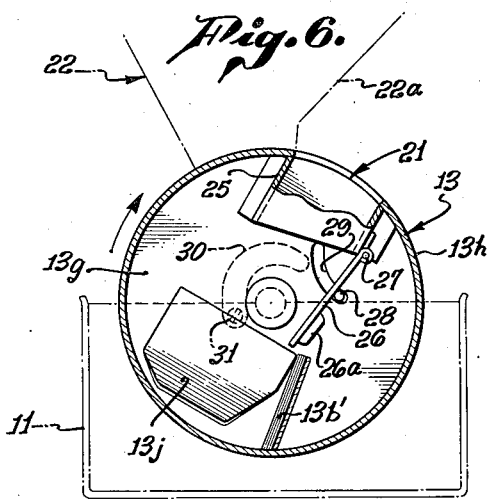
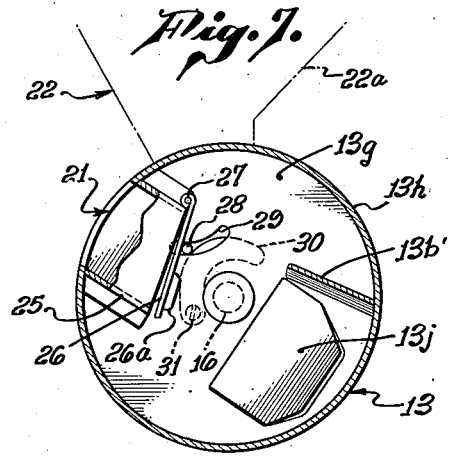
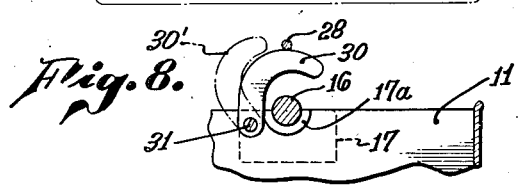
INVENTOR.
GEORGE ASHTON,
BY
ATTORNEYS.

Patented Feb. 12, 1952

2,585,293

UNITED STATES PATENT OFFICE 2,585,293

APPARATUS FOR CONTINUOUS COOKING

George Ashton, Los Angeles, Calif.

Application April 25, 1949, Serial No. 89,490

1 Claim. (Cl. 99—404)

This invention relates to apparatus for cooking edible materials, such as nut meats of all kinds, chopped sliced or diced vegetables, shrimp and similar food products which are normally "French fried," i. e., cooked in deep fat or other liquid cooking medium. More particularly the invention contemplates effecting the cooking in a continuous manner and with a minimum of attention by the operator.

One object of the invention is to provide cooking apparatus of the described type which is automatic in operation and which will operate over long periods without attention other than supplying the material to be cooked. Another object is to effect the cooking uniformly and in such a manner as to produce cooked edible material of high quality. Another object is to avoid crushing or breaking of pieces of edible material while in the apparatus. Another object is to provide a cooking apparatus which can be quickly and easily taken apart for cleaning. Still other objects will be apparent from the detailed description which follows.

The invention involves apparatus which will automatically feed the material to be cooked in successive small batches into and through a heated liquid cooking medium in a continuous manner, the medium being maintained at all times at the proper cooking temperature, and which will remove the product from such medium as soon as the cooking operation is completed. Feeding raw material in small batches avoids undue cooling of the cooking medium and results in rapid sealing of the pores so that natural flavors are preserved, and minimum absorption of the cooking medium occurs, thus making the cooked product more palatable and more easily digested. At the same time the keeping qualities of the cooked product are improved and the tendency toward rancidity is reduced, and there is less consumption of cooking medium during the cooking operation, all resulting from the reduced absorption of cooking medium.

In order to illustrate the invention and its operation, one concrete embodiment thereof is shown in the accompanying drawings in which:

Fig. 1 is a side elevational view partly broken away at one end;

Fig. 2 is a longitudinal sectional view taken generally on the line 2—2 of Fig. 4 but showing same parts in elevation;

Fig. 3 is a transverse sectional view on the line 3—3 of Fig. 2 but omitting any showing of cover and base;

Fig. 4 is a transverse sectional view on the line 4—4 of Fig. 2;

Fig. 5 is a similar sectional view but on the line 5—5 of Fig. 2;

Figs. 6 and 7 are fragmentary somewhat schematic views on the line 5—5 of Fig. 2 showing certain of the parts in different positions; and Fig. 8 is a fragmentary sectional view on an enlarged scale on line 8—8 of Fig. 2 showing a detail of the invention.

My cooking apparatus is supported by a base member or plate 9 resting on legs 10 to space the same from a table or other supporting surface. Between transversely spaced longitudinal flanges 9a on the upper face of base 9 is placed a rectangular open-top container 11 for receiving a body 12 of cooking fluid such as vegetable oil or the like, suitable for the desired cooking operation. Within the opposite ends of container 11 are arcuate or semi-circular bearing plates 11a and 11a' which are welded or otherwise secured to the end walls of the container and are additionally secured to brackets 11b extending from the inner side walls of the container. These bearing plates rotatably receive the exterior end surfaces of a cylindrical member or drum 13 so that the member is partially immersed in the body of cooking liquid 12. Suitable perforations 13a in the wall of member 13 permit movement of the cooking liquid into and out of the member as it rotates. Member 13 receives the articles of edible material to be cooked, such as nut meats, at one end intermittently in measured batches and moves the same lengthwise of said member as it rotates, by suitable means such as a spiral or helical flange 13b on the interior of member 13. The material charged into member 13 falls into the cooking fluid 12 and flange 13b moves the material which is submerged in fluid 12 the length of member 13. The cooked product is eventually lifted out of cooking fluid 12 by the slanting partition plate 13c at the end of spiral flange 13b and is discharged by spout 13d through a central opening 13e in one end wall 13f of member 13. A collar 13d' closes the space between spout 13d and flange 13b to prevent the material from passing beyond the last turn of the flange, so that all the material is picked up by partition plate 13c and discharged through spout 13d. As the nuts or other articles of cooked material are lifted out of the cooking fluid by the inclined plate 13c at the rising side of the drum, any excess of cooking fluid removed therewith is permitted to drain off by gravity and pass through the drum perforations 13a and return to the liquid body 12. A spout 14 which is mounted on the end wall of container 11 guides the cooked product into a suitable container, such as 15 (Fig. 2), below the cooking apparatus.

The opposite end plate 13g of drum member 13 has centrally mounted therein a stub shaft 16 by which member 13 is rotated. This stub shaft rests in and is supported by a half bearing such as a half-collar 17a forming an integral part of a plate 17 secured to container 11. A motor 18 is mounted upon the base 9 and is arranged to rotate drum 13 at constant speed through a detachable connection such as tongue and groove coupling elements 19 and 20. As shown, tongue element 19 is mounted on the motor shaft and groove element 20 on stub shaft 16 of drum 13. Motor 18 may be provided with speed reducing gearing and change-speed gearing so that the speed of rotation of drum 13 may be readily changed to adapt the cooking apparatus to differing cooking periods.

The mechanism for feeding the material to be cooked in batches intermittently into cooking member or drum 13 will now be described, reference being had particularly to Fig. 2 and Figs. 5 through 8. The peripheral wall portion of drum 13, at the admission end is preferably imperforate so as to provide a smooth continuous cylindrical wall portion 13h, and has an opening 21 adapted and arranged to register during each revolution of the drum with the open lower end of a hopper 22 which is mounted above drum 13. Hopper 22 has tapered walls 22a leading to its open lower end and these tapered walls have arcuate extensions 22b and 22c (Fig. 5) which conform to the cylindrical wall portion 13h of member 13 and fit over and within, respectively, the extreme ends of the adjacent bearing plate 11a on container 11. These extensions maintain the open end of the hopper in proper relation to rotating member 13 so that the cylindrical wall of the latter holds the charge in hopper 22 at all times when opening 21 is not in register with the open end of the hopper. The upper portion of the hopper is supported by pivot pin 23 for a purpose later to be described, this pivot pin having its ends received in suitable openings in the side members of a partial housing 24 secured to and extending upwardly from base 9 around motor 18. The hopper may be supported in its lowered or operative position, as shown, by any suitable supporting means such as by bearing engagement of extensions 22b and 22c with the imperforate drum wall portion 13h, or by supporting engagement of the lower ends of said extensions with the upper ends of bearing plate 11a.

Mounted within drum 13 immediately adjacent opening 21 is a measuring cup or receptacle 25 adapted to receive a measured charge of material to be cooked when opening 21 registers with the open end of hopper 22 as clearly shown in Fig. 5. In this position the lower or inner end of measuring cup 25 is closed by a hinged closure member 26 hinged at 27 to one side of the cup and provided with a weight 26a to promote movement thereof by gravity. A rod 28 attached to closure 26 extends through a curved slot 29 in the end wall 13g of member 13 to engage a cam surface on cam 30. In its operative position cam 30 extends over and above stub shaft 16 as clearly shown in full lines in Fig. 8. Cam 30 is pivotally mounted at 31 on the end wall of container 11 and in operative position engages the annular half bearing 17a on plate 17 as a stop. The pivotal mounting of the cam permits it to be swung to the broken line position 30' (Fig. 8), away from the shaft 16 so that drum 13 can be lifted up when it is to be removed from container 11.

Sequential positions of the measuring cup 25 during rotation of drum 13 are shown in Figs. 5, 6 and 7. In Fig. 5 opening 21 in the drum is in full register with the open end of the hopper at which time the material to be cooked passes from the hopper by gravity into and fills cup 25. At this time closure member 26 is held by cam 30 and rod 28 in closed position and continues in this position until opening 21 is entirely out of register with hopper 22. Rod 28 then passes beyond the cam surface and closure 26 falls open by gravity (see Fig. 6). The material in cup 25 then falls to the lower portion of member 13 into the body of cooking fluid. The particles of material falling from receptacle 25 are directed by the closure 26 and by an inclined deflector plate 13j, into position in front of the initial turn of flange 13b (see Figs. 2 and 6) which then moves the material lengthwise of element 13 while the material continues to be immersed in the cooking fluid until it is discharged in fully cooked condition through 13c. As the drum continues to rotate opening 21 therein again approaches hopper 22 and rod 28 on closure 26 is again engaged by cam 30 as shown in Fig. 7 and the closure 26 is forced to closed position by the time the opening 21 starts to register with the open end of the hopper. Slot 29 limits the opening movement of the closure 26 by engagement of rod 28 with the end of said slot as shown in Fig. 6 so as to direct the falling material upon the inclined plate 13j and in front of the end portion 13b' of flange 13.

In order to prevent crushing of food material when the following edge of opening 21 cuts off and completely closes the open end of the hopper, suitable means are provided in the form of a yieldable wall portion or member on the hopper. To this end the tapered wall 22a of the hopper is recessed or cut away and a portion of extension 22c is disposed in spaced relation to member 13 to provide a chamber 22d. An arm 22e is pivotally mounted at 22f in chamber 22d and carries a cylindrical member 22g which normally rests by gravity on member 13 but can swing upwardly therefrom under the pressure of any particles of material to be cooked which project from cup 25 when the latter approaches the position shown in Fig. 6. The upward yielding of member 22g permits such particles to pass beneath the member without being crushed and they then fall through measuring cup 25 into member 13 as soon as closure member 26 opens (see Fig. 6).

The extensions 22b and 22c and bearing plate 11a close the opening 21 at all rotative positions of the drum 13 except when said opening is passing beneath the open end of hopper 22 and beneath the chamber 22d, so as to prevent any possible discharge of the particles of material from the drum through said opening.

In order to maintain the proper level of the body of cooking fluid 12 without attention from the operator of the apparatus a reserve tank 32 is mounted above member 13 and has a pipe connection 33 extending downwardly at one side of member 13 to a point just below the desired level of the body of cooking fluid 12. The closure cap 32a on tank 32 makes an air tight fit with the result that cooking fluid passes automatically from reserve tank 32 whenever the level of the body of cooking fluid falls below the end of pipe 33 so as to admit air into tank 32 through said pipe. For convenience tank 32 is secured to hopper 22 and is supported by the latter. When the cooking apparatus is not in use the connection between the tank and pipe 33 may be broken by a hand operated valve 34.

Heating of the body of cooking fluid 12 is effected in any suitable manner as by an electric heating coil 35 in the bottom of container 11. The connection to coil 35 may be broken at 36 when container 11 is removed from the base. The cooking fluid is held at the desired temperature automatically by suitable thermostatic control means, such as a vapor pressure thermostat which may include a liquid-filled pressure bulb 37 in the body of cooking fluid 12, such bulb having a connecting pipe 38 extending upwardly at one side of member 13 (see Fig. 4). The pipe 38 is attached by a supporting arm 38a to hopper 22 so as to be movable therewith, and has an extensible or flexible portion in the form of coil 38a'. Both pipe 38 and the connection to heater 35 lead to a control box 40 containing any known or suitable thermostatic control means (not shown). A single manually operated member 41 may be used as the on and off switch as well as the setting member for the thermostatic control. Control box 40 is shown mounted on the side of the fixed housing 24.

The assembly of container 11, drum 13 and hopper 22 is enclosed by a movable housing member 42 which is open above hopper 22 as well as at the position of the discharge spout 14 at the discharge end of the apparatus. Member 42 is hinged at points 43 to the side members of the fixed housing 24. Above hopper 22 is a cover 44 which is hinged at 45 to housing 24. Lifting of cover 44 gives the operator access to hopper 22.

The apparatus may be readily disassembled for cleaning at any time and without the use of tools. To effect this, cover 44 is swung back out of position. Housing member 42 is then swung upward and back on its pivots 43. Hopper 22 carrying reserve tank 32, feed line 33 and thermostatic pressure bulb 37 may then be swung out and up on pivot pin 23.

It will be noted that the thermostat bulb 37 together with its connecting pipe 38 and supporting arm 38a, and the liquid feed line 33, are disposed close to one side of the container 11 so as to readily pass the drum 13 when they are swung upward with the hopper out of the container. The operator may then break the electrical connection to the heating coil 35 at 36, and then slide the container 11 with the heating coil 35 and drum 13 resting therein, outwardly (toward the right in Figs. 1 and 2) on the base plate 9 between the guide flanges 9a, disengaging coupling means 19, 20. These parts may be completely removed from the apparatus; the drum 13 and heating coil 35 can then be lifted out of the container, and all the parts can be thoroughly cleaned. The body of cooking medium 12 removed with the container may be poured therefrom to permit cleaning the container, and may be either discarded or saved for further use. After cleaning the parts may be quickly re-assembled by reversing the above steps.

From the above it will be apparent that the cooking apparatus herein disclosed is simple and highly efficient. In use the cooking fluid is first brought to operating temperature; the thermostatic control is then set to maintain such temperature and then the apparatus may be operated for long periods without attention other than supplying the hopper with the material to be cooked and removing the cooked product from receptacle 15. Since the material to be cooked is fed to cooking drum 13 intermittently and in small batches excessive cooling of the cooking fluid is avoided. Excessive loss of fluid by absorption in the material undergoing cooking is avoided and natural flavors are retained. Crushing and breaking of the food particles in the feeding operation is avoided and a product of high and uniform quality is always obtained.

The means described herein for feeding the material from the hopper into the cooking member or drum and for preventing crushing or breaking of the material during such feeding are described and claimed in my divisional application Ser. No. 202,661, filed December 26, 1950.

While the invention has been herein disclosed in what is now considered to be a preferred form, it is to be understood that the invention is not limited to the specific details thereof but includes all changes, modifications and adaptations within the scope of the appended claim.

I claim:

In cooking apparatus, in combination, a container for a body of cooking fluid, means for heating said fluid and maintaining it at cooking temperature, a hollow member rotatably mounted over said container and extending therewithin to be partly immersed in the cooking fluid, means for rotating said member, a hopper for material to be cooked, said hopper having an open end adjacent to and closed by the wall of said member, said member having an opening arranged to register with said open end, a measuring cup within said member to receive a batch of material from said hopper on each revolution of said member, a hinged bottom plate in said cup, a cam holding said hinged plate in closed position while said cup is being filled and until said opening is out of register with said hopper, said hinged plate being movable by gravity to discharge material from said cup into said member, means for moving the material discharged from said measuring cup within said member while the material is subjected to the cooking action of said fluid, and means for discharging the cooked material from said member.

GEORGE ASHTON.

REFERENCES CITED

The following references are of record in the file of this patent:

UNITED STATES PATENTS

| Number | Name | Date |
|---|---|---|
| 1,055,736 | Gibson | Mar. 11, 1913 |
| 1,154,675 | Vaudreuil | Sept. 28, 1915 |
| 1,252,613 | Phelps | Jan. 8, 1918 |
| 1,581,933 | Larsen | Apr. 20, 1926 |
| 1,630,676 | Smith | May 31, 1927 |
| 1,789,428 | Deschenes et al. | Jan. 20, 1931 |
| 2,004,775 | Wright | June 11, 1935 |
| 2,018,419 | Richeson | Oct. 22, 1935 |
| 2,077,395 | Chapel | Apr. 20, 1937 |
| 2,179,035 | Ferry | Nov. 7, 1939 |
| 2,229,167 | Carpenter | Jan. 21, 1941 |
| 2,299,080 | De Back | Oct. 20, 1942 |
| 2,447,039 | Stabler | Aug. 17, 1948 |